United States Patent [19]

Hanson

[11] Patent Number: 5,072,619
[45] Date of Patent: Dec. 17, 1991

[54] PENDULOUS ASSEMBLY INCLUDING SPECIFICALLY CONFIGURED MOUNTING PADS

[76] Inventor: Richard A. Hanson, 21220 N.E. 156th St., Woodinville, Wash. 98072

[21] Appl. No.: 541,480

[22] Filed: Jun. 21, 1990

Related U.S. Application Data

[63] Continuation of Ser. No. 255,619, Oct. 11, 1988, abandoned.

[51] Int. Cl.⁵ ............................................. G01P 15/13
[52] U.S. Cl. .................................................. 73/517 B
[58] Field of Search ...................... 73/497, 514, 517 R, 73/517 B

[56] References Cited

U.S. PATENT DOCUMENTS

| | | | |
|---|---|---|---|
| 4,250,757 | 2/1981 | Hanson | 73/517 B |
| 4,488,445 | 12/1984 | Aske | 73/517 R |
| 4,592,234 | 6/1986 | Norling | 73/514 |

Primary Examiner—John E. Chapman
Attorney, Agent, or Firm—Flehr, Hohbach, Test, Albritton & Herbert

[57] ABSTRACT

A pendulous assembly for use in an accelerometer or other such device which senses forces acting on the device in a particular direction is disclosed herein. This assembly includes a proofmass, an arrangement including a frame supporting one end of the proofmass for back and forth pivotal movement about a given axis to a resting plane which entirely contains the proofmass when the latter is at rest, and specifically configured mounting pads connecting the frame and proofmass to main support forming part of the overall force sensing device. In certain embodiments disclosed herein the end edges of these mounting pads are exposed. In other embodiments, the end and side edges of the pads are exposed.

27 Claims, 2 Drawing Sheets

U.S. Patent    Dec. 17, 1991    Sheet 1 of 2    5,072,619
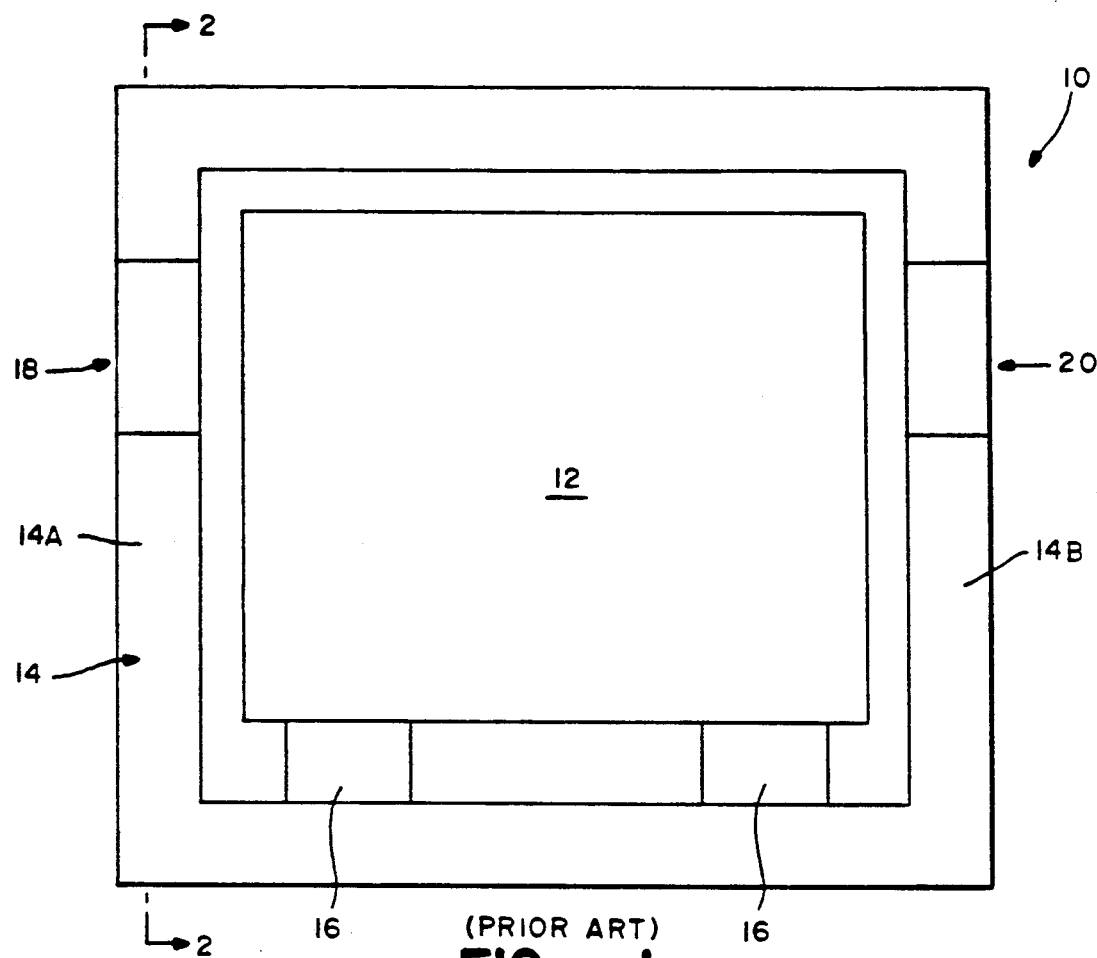
(PRIOR ART)
FIG.—1
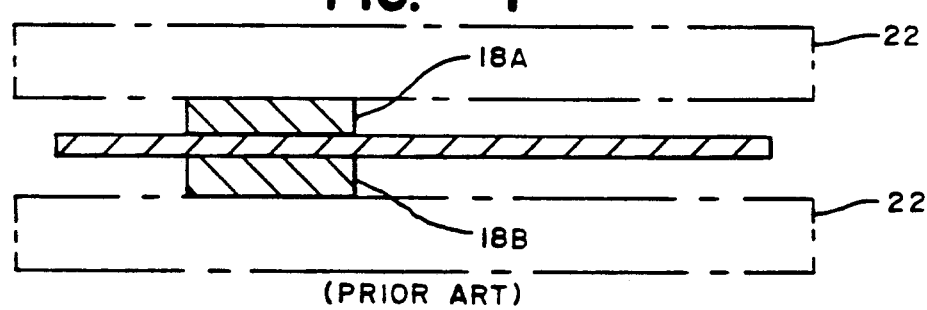
(PRIOR ART)
FIG.—2
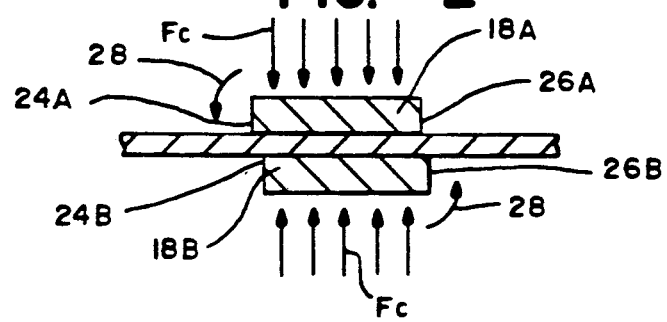
FIG.—3

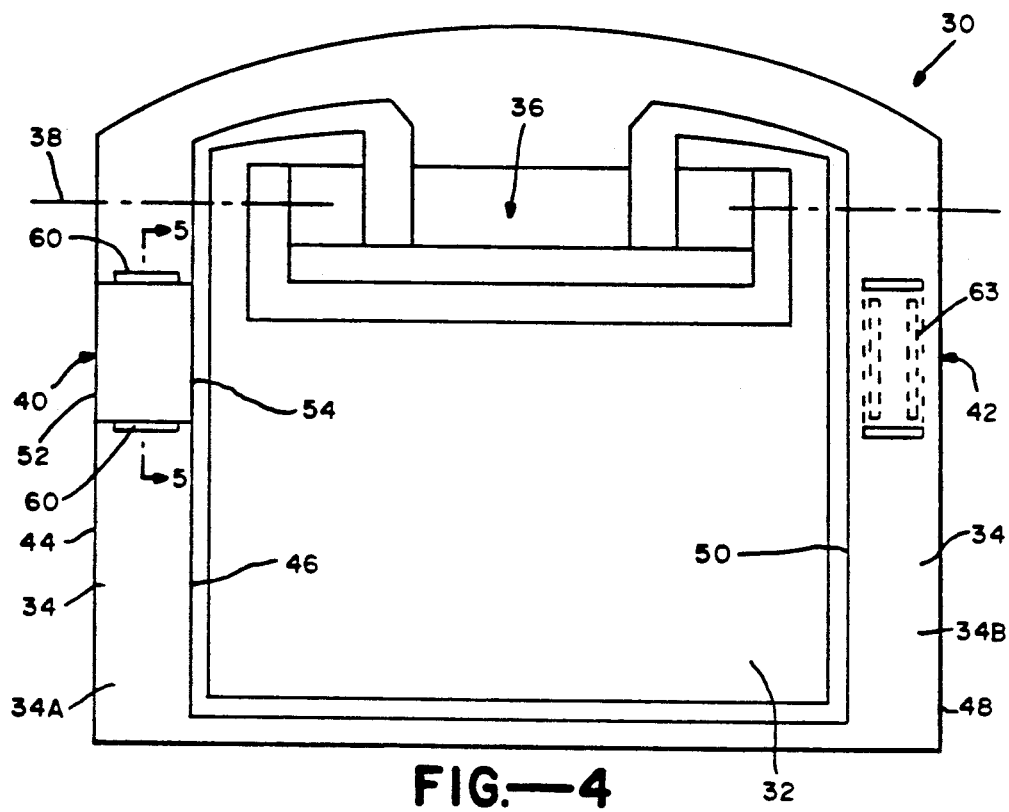

PENDULOUS ASSEMBLY INCLUDING SPECIFICALLY CONFIGURED MOUNTING PADS

This is a continuation, of application Ser. No. 07/255,619 filed Oct. 11, 1988 now abandoned.

The present invention relates generally to a pendulous assembly for use in an accelerometer or other such force sensing device, and more particularly to specifically configured mounting pads which serve to connect the pendulous assembly to a main support forming part of the device. The present invention relates more particularly to a force sensing device of the type disclosed in Applicant's co-pending application Ser. No. 899,975, filed Aug. 25, 1986, now abandoned and his continuation-in-part application Ser. No. 221,116, filed July 19, 1988, now U.S. Pat. No. 4,926,689, both of which are incorporated herein by reference.

In the above recited co-pending patent applications, there is disclosed a prior art pendulous or proofmass assembly for use in an accelerometer or other such force sensing device. That prior art assembly has been reproduced in FIG. 1 of the present application and is generally designated by the reference numeral 10. The pendulous assembly 10 is shown including a flat, generally rectangular proofmass 12 and a support arrangement including a flat frame 14 and flexures 16 supporting the proofmass for back and forth pivotal movement about a given axis through a horizontal resting plane which contains the proofmass, frame and flexures when the proofmass is at rest. The overall assembly may include other components such as pickoff plates and torque coils, as described in the Hanson parent application, Ser. No. 899,975. In addition, the assembly includes one pair of top and bottom mounting pads 18 on one section 14A of frame 14, on one side of the proofmass, and a second pair of top and bottom mounting pads on an opposite section 14B of the frame, on opposite side of the proofmass. As best illustrated in FIG. 2, the top one of the mounting pads 18 (designated at 18A) is disposed on the top side of frame section 14A while the bottom mounting pad 18 (designated 18B) is mounted on the underside of frame section 18A and is intended to be in vertical alignment with mounting pad 18A. The mounting pads 20 are positioned in a similar way on frame section 14B.

Still referring to FIG. 2 in conjunction with FIG. 1, the purpose for the mounting pads is to mount the entire pendulous assembly to a main support by means of opposing clamps indicated by means of dotted line at 22. Note that the clamps engage the outwardly facing surfaces of the mounting pads 18A and B on opposite sides of frame section 14A and, while not shown, they engage the outer surfaces of clamps 20 on opposite sides of frame section 14B. This is well known in the art and, hence, will not be described in further detail. Suffice it to say that the entire pendulous assembly is supported by clamps 22 so that the proofmass is free to pivot or deflect back and forth relative to frame 14, the clamps and the outside world (e.g., the main support to which the frame is connected by means of the clamps).

As discussed in detail in Applicant's co-pending applications recited above, it is extremely critical to the operation of the overall force sensing device that the proofmass, flexures and frame be as free as possible of random and uncontrollable stresses and strains. One particular situation which induces undesired and uncontrolled strains into frame 14 is when the top and bottom mounting pads are not truly aligned along their edges, as exemplified diagrammatically in FIG. 3. As seen there, the front edge 24A of mounting pad 18A, that is, the edge furthest away from flexure 16, is not in direct vertical alignment with the front edge 24B of mounting pad 18B. This is also true for the back edges 26A and 26B. As a result, when clamping forces Fc are applied to the mounting pads as a result of clamps 22, the misalignment between two pads tends to produce a torque or twisting in the frame adjacent the pads, as diagrammatically illustrated by arrows 28. Such torque or twisting forces, in turn, produce undesired strains in the frame. These forces are especially troublesome to the back edges of the mounting pads since they are closest to the flexures, whereas the front edges of the pads have little effect and, hence, the back edges primarily determine any adverse affects on the way in which the proofmass pivots back and forth during operation of the overall force sensing device. In any event, as will be in hereinafter, it is desirable to keep such stresses on either ends of the mounting pads or, for that matter, on their sides, to a minimum. This can be accomplished by ensuring that each pair of top and bottom mounting pads are indeed in vertical alignment with one another. In the case of proofmass assembly 10, it is considerably easier to ensure that the side edges of each pair of mounting pads are in alignment if they are the full width of the frame and if they are co-extensive with the side edges of their respective frame section. However, it is more difficult to ensure that the end edges are in alignment since they are not co-extensive with any edges of the frame of proofmass assembly 10.

In view of the foregoing, it is an object of the present invention to provide pendulous assembly of the general type described above, and specifically an assembly which is designed to ensure alignment between cooperating top and bottom mounting pads.

A more particular object of the present invention is to provide a pendulous assembly which is designed to ensure that at least the end edges of each pair of mounting pads are in vertical alignment with one another.

Another specific object of the present invention is to provide a proofmass assembly which is designed so as to ensure that both the end edges and the side edges of each pair of mounting pads are in vertical alignment with one another.

As will be seen hereinafter, the pendulous assembly disclosed herein includes at least one pair of vertically aligned top and bottom, generally rectangular mounting pads connected with the top side and bottom side of its frame, respectively, for mounting the frame and its associated proofmass to a main support forming part of the force sensing device. The top and bottom mounting pads have vertically aligned side and end pad to pad edges. In one embodiment disclosed herein the pads may not be the full width of the frame and a through-slit is provided in the frame adjacent each end edge so as to define single vertically continuous edges to ensure that the end edges of the mounting pads are, indeed, vertically aligned. In a second embodiment, the entire mounting pad including its end edges is connected to the frame in an outboard manner so that the end edges are exposed without the necessity for slits. In a third embodiment, a longitudinal through-slit is provided in the frame adjacent the inboard side edges of the mounting pads, whereby to ensure that most of the length of those edges are vertically aligned. Other embodiments will also be disclosed.

The overall pendulous assembly and the various mounting pad embodiments will be described in more detail hereinafter in conjunction with the drawings, wherein:

FIG. 1 is a plan view of part of a pendulous assembly designed in accordance with the prior art;

FIG. 2 is a side sectional view of the assembly of FIG. 1, taken generally alone line 2—2 in FIG. 1;

FIG. 3 diagrammatically illustrates a possible structural drawback to the prior art pendulous assembly of the type illustrated in FIG. 1 and 2;

FIG. 4 is a plan view of a pendulous assembly designed in accordance with the present invention;

FIG. 5 is a sectional view of a portion of the assembly of FIG. 4, taken generally along line 5—5 in FIG. 4, specifically illustrating a particular mounting pad arrangement designed in accordance with the present invention; and FIGS. 6–8 respectively illustrate mounting pad arrangements designed in accordance with three different embodiments of the present invention.

Turning now to the drawings, wherein like components are designated by like reference numerals, attention is immediately directed to FIGS. 4 and 5 since FIGS. 1-3 have been discussed previously. FIG. 4 illustrates a pendulous assembly 30 corresponding in function to assembly 10 and those described in Applicant's co-pending applications recited above. To that end, the pendulous assembly shown in FIG. 4 includes a flat proofmass 32 and a support arrangement including a flat frame 34 and a flat flexure network generally indicated at 36 supporting the proofmass for back and forth pivotal movement about a given axis 38 through a horizontal resting plane (in the plane of the paper), which contains the proofmass, frame and flexure network when the proofmass is at rest. Like proofmass assembly 10, assembly 30 may include other components which are not pertinent to the present invention. The particular flexure network 36 is one which has certain novel features described in one of Applicant's parent applications. It is to be understood, however, that the present invention is not limited to any particular flexure network, as will be apparent hereinafter.

The proofmass assembly 30 also includes two pairs of vertically aligned mounting pads 40 and 42. Like mounting pads 18 and 20 forming part of previously described assembly 10, the mounting pads 40 are located on the top and bottom of one side section 34A of frame 34 and mounting pads 42 are located on the top and bottom of an opposite frame section 34B. Both frame sections 34A and 34B extend normal to axis 38, as seen in FIG. 4. As also seen in this figure, the frame sections 34A and 34B are disposed on opposite sides of proofmass 32. The frame section 34A includes a longitudinally extending outboard side edge 44 and a longitudinally extending inboard edge 46, the latter being closer to proofmass 32. In a similar manner, frame section 34B includes a longitudinally extending outboard edge 48 and a longitudinally extending inboard edge 50.

Referring to FIG. 5, the mounting pads 40 are shown in section. The upper pad is indicated at 40A and the lower pad is indicated at 40B. Returning to FIG. 4, it can be seen that the outboard and inboard side edges 52 and 54, respectively, of upper and lower mounting pads 40A and 40B are co-extensive with the outboard and inboard edges 44 and 46 of frame section 34. As a result, all of these edges are exposed therefore, and, it can be readily visually seen whether they are in vertical alignment with one another and thereby define vertically aligned common pad to pad edges. In fact, the specific way in which the proofmass assembly is to be made, a preferred embodiment, ensures that all of these side edges are in vertical alignment with one another. More specifically, in this preferred embodiment, the proofmass 32, frame 34, flexure network 36 and the mounting pads 40 and 42 are integrally formed as a single unit from a quartz wafer. The proofmass 32, flexure network 36 and frame 34, except for sections corresponding to the mounting pads, are chemically etched thinner than the mounting pads so that the latter are raised relative to the other components. As illustrated in FIG. 5, the vertical edges 52 and 54 are not exposed to etching since they are actually cut initially and, thus are well defined, whereas the liner where the etching process takes place leaves an edge which is not well defined.

From the procedure just described, it should be apparent that the side edges 52 and 54 of pad 40 are automatically aligned with one another since they are cut that way. This is also true for mounting pads 42. However, it is not true for the end edges of either pair of mounting pads. The end edges of mounting pad 40A are shown at 56A and 58A in FIG. 5, and the end edges of mounting pad 40B are shown at 56B and 58B in the same figure. The etching process described above does not ensure that end edge 56A vertically aligns up with end edge 56B or that end edge 58A vertically aligns up with end edge 56B because of the frame section therebetween. Therefore, in accordance with the present invention, through slits 60 are provided (cut) in frame section 34A adjacent the end edges of pads 40. In one case of, for example, edges 56A and 56B, the presence of through-slit 60 results in each of the end edges defining a single vertically continuous, exposed pad to pad edge 62 along substantially the entire extent of the slit. In the case of end edges 58A and 58B, slit 60 results in a similar vertically continuously exposed edge 64. These vertically continuous edges ensure that the end edges are vertically aligned with one another in the intended manner. This is also true for mounting pad 42. In actual practice, the slits 60 are provided in the quartz wafer after the latter is etched. In that way, the end edges of the mounting pads automatically line up with one another in the same manner as the lateral or side edges of the mounting pads. It may also be desirable to provide similar side slits so that it is not necessary to rely on the alignment of inboard and outboard side edges 52 and 54. Corresponding side slits 63 are shown along and through pad 42 by means of dotted lines. In this case, the side edges of pads 42 are spaced inward of the side edges of frame section 34B, as also indicated by dotted line. Similar side slits could be provided in pads 40.

FIG. 6 illustrates a frame section 66 corresponding in function to, for example, frame section 34 of assembly 30. However, in this embodiment, rather than having mounting pads on top and bottom of the frame section, the vertically aligned upper and lower mounting pads 68 are provided outboard of the outboard longitudinal edge 70 of frame section 66. As illustrated in FIG. 6, the end edges and the outboard side edge of mounting pad 68 are laterally offset or outward of frame section 66. In that way, the end edges and the outboard edges of mounting pad 68 define vertically continuous exposed edges. In a preferred embodiment, the mounting pads 68, like previously described mounting pads 40 and 42, are formed integrally with the frame section 66 and the latter is etched thinner than the pads.

FIG. 7 illustrates an embodiment identical to the one shown in FIG. 6 but includes a longitudinally extending through-slit extensive with the inboard side edges of outboard mounting pads 68. This provides the same advantage as previously recited slit 60, that is, slit 72 results in a single vertically continuous exposed edge along the inboard side edges of aligned mounting pads 68.

The mounting pad arrangement shown in FIG. 8 results from separating frame section 70 into two separate and distinct segments 70' and 70" which are respectively connected to opposite inboard ends of a pair of vertically aligned outboard mounting pads 74. As in the previous embodiments, mounting pad 74 can be integrally formed with frame segments 70' and 70" except that the latter are etched thinner than the mounting pads.

In all of the embodiments described in FIGS. 6–8, similar mounting pads will most likely be provided on opposite sides of the frame, as in the case of assembly 30. Moreover, it is to be understood that while these mounting pad embodiments preferably form an integral unit with the frame and from a quartz wafer, the present invention is not limited to this particular approach. For example, it may be that the mounting pads are separate from the frame. In this case, the slits in the frame (where used) would serve to align cooperating pads. Alignment pins through the slits may be necessary to achieve proper alignment between cooperating pads. Moreover, it is to be understood that the mounting pads of the present invention are not limited to pendulous type accelerometers but may be incorporated into translational devices or other types of transducers.

I claim:

1. In a pendulous assembly for use in an accelerometer or other such force sensing device, said assembly including a flat proofmass, means including a flat frame supporting said proofmass for back and forth pivotal movement about a given axis through a horizontal resting plane which contains said proofmass and said frame when the proofmass is at rest, the improvement comprising at least one pair of vertically aligned top and bottom generally rectangular mounting pads connected with the top side and the bottom side of said frame, respectively, for mounting the frame and proofmass to a main support forming part of the force sensing device, said mounting pads having first vertically aligned, horizontally extending lateral edges parallel with said given axis and second vertically aligned, horizontally extending lateral edges parallel with said given axis, said pads being configured so that at least most of their first lateral edges together with sections of said frame between the pads define a first single vertically continuous exposed edge, said pads being configured so that at least most of their second lateral edges together with sections of said frame between the pads define a second single vertically continuous exposed edge, wherein said frame including a pair of frame sections which extend on opposite sides of said proofmass normal to said given axis, wherein said one pair of mounting pads is connected with one of said frame sections on one of said sides of said proofmass, and wherein said pendulous assembly includes a second substantially identical pair of vertically aligned top and bottom mounting pads connected with the other of said frame sections on the opposite side of said proofmass.

2. The improvement according to claim 1 wherein said frame includes through-slits adjacent each of said first and second vertically aligned edges of each of said mounting pads so as to provide each of said single vertically continuous exposed edge.

3. The improvement according to claim 1 wherein said frame sections on opposite sides of said proofmass include outboard edges extending normal to said given axis, and wherein each pair of vertically aligned mounting pads is connected with one of said frame sections such that each of its first and second vertically continuous edges is located outboard of the outboard edge of its adjacent frame section.

4. The improvement according to claim 3 wherein each pair of said mounting pads has first vertically aligned, horizontally extending outboard longitudinal edges normal to said given axis and second vertically aligned, horizontally extending inboard longitudinal edges normal to said given axis, each pair of pads being configured so that at least most or its first longitudinal edges and most of their second longitudinal edges together with sections of said frame between the pads define first and second outboard and inboard vertical continuous exposed edges.

5. The improvement according to claim 4 wherein said frame includes a through-slit adjacent each of said second vertically continuous inboard longitudinal edges of each of said mounting pads so as to expose said last-mentioned edges.

6. The improvement according to claim 3 wherein each of said frame sections on opposite sides of proofmass include two spaced apart subsections having adjacent ends connected with a respective one of said mounting pads at opposite ends of the inboard longitudinal edge of that pad, whereby both the vertically aligned inboard and outboard edges of each mounting pad result in inboard and outboard vertical continuous exposed edges.

7. The improvement according to claim 1 wherein said frame includes a through-slit adjacent said first single vertically continuous edge, whereby to expose said last-mentioned edge.

8. The improvement according to claim 1 wherein said frame includes a through-slit adjacent each of said first and second single vertically continuous edges, whereby to expose each of said last-mentioned edges.

9. The improvement according to claim 8 wherein said frame includes a section thereof containing said vertically aligned mounting pads and through-slits, said frame section including inboard and outboard edges on opposite sides of said pads and extending normal to said given axis.

10. The improvement according to claim 9 wherein said frame section includes a pair of spaced apart through-slits on opposite sides of said pads adjacent the inboard and outboard edges of said frame section and normal to said given axis, whereby said inboard and outboard edges together with sections of said frame between the pads define single vertically continuous exposed inboard and outboard edges of said vertically aligned pads.

11. A pendulous assembly for use in an accelerometer or other such force sensing device which senses force acting on the device in a particular direction, said assembly comprising:

(a) a proofmass;

(b) means including a flat frame supporting one end of said proofmass for back and forth pivotal movement about a given axis through a resting plane which entirely contains said proofmass when the proofmass is at rest, said frame including elongated side sections located on opposite sides of said proofmass and extending normal to the given axis, each of said side sections including a longitudinally extending inboard edge adjacent an edge said proofmass and a longitudinally extending outboard edge further from said proofmass; and (c) a pair of vertically aligned top and bottom, generally rectangular mounting pads located on the top side and the bottom side of each of said sections of said frame for mounting the frame and proofmass to a main support forming part of the overall force sensing device, each pair of mounting pads on each of said frame sections having longitudinally extending inboard and outboard edges in alignment with the inboard and outboard edges of their adjacent frame section, and also having laterally extending end edges;

(d) each of said frame sections including a pair of laterally extending through-slits located on opposite ends of the mounting pads adjacent the lateral end edges of those pads.

12. An assembly according to claim 11 wherein said proofmass, said frame, and said mounting pads are integrally formed from a single sheet of material such that said frame is formed from a thinner segment of the material than said mounting pads.

13. A pendulous assembly for use in an accelerometer or other such device which senses forces acting on a device in a particular direction, said assembly comprising:

(a) a proofmass;

(b) means including a frame supporting one end of said proofmass for back and forth pivotal movement about a given axis through a resting plane which entirely contains said proofmass when the latter is at rest, said frame including a pair of longitudinally extending sections on opposite sides of said proofmass, each of said frame sections including a longitudinally extending inboard edge normal to said given axis and adjacent one edge of said proofmass and a longitudinally extending outboard edge normal to said given axis and further from said proofmass; and (c) two pair of vertically aligned top and bottom, generally rectangular mounting pads, each pair of mounting pads having longitudinally extending inboard and outboard edges and opposing lateral edges, the longitudinally extending inboard edges of each mounting pad being connected to the longitudinally extending outboard edge of a corresponding frame section, whereby each mounting pad extends laterally outboard from its associated frame section.

14. An assembly according to claim 13 wherein each of said frame sections include a longitudinally extending through-slit adjacent a section of the longitudinally extending inboard edges of the mounting pads connected to that frame section.

15. An assembly according to claim 13 wherein each of said frame sections is comprised of a pair of spaced-apart sections, each of which is connected to opposite end sections of its corresponding mounting pads.

16. In an assembly for use in force sensing device, said assembly including a proofmass, means including a flat frame supporting said proofmass for predetermined movement, the improvement comprising at least one pair of vertically aligned top and bottom generally rectangular mounting pads connected with the top side and the bottom side of said frame, respectively, for mounting the frame and proofmass to a main support forming part of the force sensing device, said mounting pads having first vertically aligned, horizontally extending lateral edges parallel with said given axis and second vertically aligned, horizontally extending lateral edges parallel with said given axis, said pads being configured so that at least most of their first lateral edges together with sections of said frame define a first single vertically continuous exposed edge, said pads being configured so that at least most of their second lateral edges together with sections of said frame between said pad define a second single vertically continuous exposed edge said frame includes a pair of frame sections which extend on opposite sides of said proofmass normal to said given axis, wherein said one pair of mounting pads is connected with one of said frame sections on one of said sides of said proofmass, and wherein said pendulous assembly includes a second substantially identical pair of vertically aligned top and bottom mounting pads connected with the other of said frame sections on the opposite side of said proofmass.

17. The improvement according to claim 16 wherein said frame includes through-slits adjacent each of said first and second vertically aligned edges of each of said mounting pads so as to provide each of said single vertically continuous exposed edges.

18. In a pendulous assembly for use in an accelerometer or other such force sensing device, said assembly including a flat proofmass, means including a flat frame supporting said proofmass for back and forth pivotal movement about a given axis through a horizontal resting plane which contains said proofmass and said frame when the proofmass is at rest, said frame having a section extending longitudinally in a direction generally normal to the given axis, the improvement comprising a pair of vertically aligned top and bottom mounting pads connected respectively with the top and bottom sides of the longitudinally extending section of said frame for mounting the frame and proofmass to a main support, said mounting pads having first and second pairs of vertically aligned laterally extending edges parallel to said given axis, and a laterally extending slit formed in the longitudinally extending section of the frame and having a wall which is aligned vertically with the first pair of vertically aligned edges on the pads to define a vertically continuous exposed edge between the pads.

19. The pendulous assembly of claim 18 wherein the first pair of vertically aligned edges on the pads is closer to the given axis than is the second pair of vertically aligned edges.

20. The pendulous assembly of claim 18 wherein the mounting pads also have longitudinally extending side edges which are aligned vertically with each other and with side edge portions of the longitudinally extending section of the frame.

21. The pendulous assembly of claim 18 wherein the proofmass, the frame and the mounting pads are formed as an integral structure by etching from a quartz wafer, and the first pair of vertically aligned edges and the slit are formed by cutting after the wafer is etched.

22. In a pendulous assembly for use in an accelerometer or other such force sensing device, said assembly including a flat proofmass, means including a flat frame supporting said proofmass for back and forth pivotal movement about a given axis through a horizontal resting plane which contains said proofmass and said frame when the proofmass is at rest, said frame having a section extending longitudinally in a direction generally normal to the given axis, the improvement comprising a pair of vertically aligned top and bottom mounting pads connected respectively with the top and bottom sides of the longitudinally extending section of said frame for mounting the frame and proofmass to a main support, said mounting pads having first and second pairs of vertically aligned laterally extending edges parallel to said given axis, and a pair of laterally extending slits formed in the longitudinally extending section of the frame and having walls which are aligned vertically with the first and second pairs of vertically aligned edges on the pads to define vertically continuous exposed edges between the pads.

23. The pendulous assembly of claim 22 wherein the longitudinally extending frame section has inboard and outboard edges extending normal to said given axis on opposite sides of said pads, and the mounting pads have longitudinally extending side edge portions which are aligned vertically with each other and with the inboard and outboard edges of the frame section.

24. The pendulous assembly of claim 22 wherein said frame section includes inboard and outboard edges extending normal to said given axis and a pair of spaced apart through-slits on opposite sides of said pads adjacent to the inboard and outboard edges in vertical alignment with side edges of the pads.

25. The pendulous assembly of claim 22 wherein the proofmass, the frame and the mounting pads are formed as an integral structure by etching from a quartz wafer, and the first and second pairs of vertically aligned edges and the slits are formed by cutting after the wafer is etched.

26. In a pendulous assembly for use in an accelerometer or other such force sensing device, said assembly including a flat proofmass, means including a flat frame supporting said proofmass for back and forth pivotal movement about a given axis through a horizontal resting plane which contains said proofmass and said frame when the proofmass is at rest, the improvement comprising at least one pair of vertically aligned top and bottom mounting pads connected with the top side and the bottom side of said frame, respectively, for mounting the frame and proofmass to a main support forming part of the force sensing device, said mounting pads having first vertically aligned, horizontally extending lateral edges parallel with said given axis and second vertically aligned, horizontally extending lateral edges parallel with said given axis, said pads being configured so that at least most of their first and second lateral edges together with sections of said frame between the pads respectively define a first and second single vertically continuous exposed edges, said frame including an outboard edge extending normal to said given axis, and wherein said mounting pads are connected with said frame such that its first and second vertically continuous edges are located outboard of the outboard edge of said frame.

27. In a pendulous assembly for use in an accelerometer or other such force sensing device, said assembly including a flat proofmass, means including a flat frame supporting said proofmass for back and forth pivotal movement about a given axis through a horizontal resting plane which contains said proofmass and said frame when the proofmass is at rest, said frame including a pair of frame sections which extend on opposite sides of said proofmass normal to said axis, the improvement comprising first and second pairs of vertically aligned top and bottom mounting pads projecting from the top side and the bottom side of respective ones of the frame sections for mounting the frame and proofmass to a main support, each of said first and second pairs of mounting pads having vertically aligned edges extending in a direction parallel to the axis and on the sides of the pads closest to the axis, said pads and said frame being configured so that the edges in each pair of pads together with a portion of said frame between the pads define a vertically continuous exposed edge between the pads.

* * * * *